(12) United States Patent
Groleau et al.

(10) Patent No.: US 7,789,415 B2
(45) Date of Patent: Sep. 7, 2010

(54) MOUNTING ARRANGEMENT FOR MOUNTING AN AIR-BAG MODULE

(75) Inventors: Laurent Groleau, Migne Auxances (FR); Olivier Bertrand, Courcôme (FR); Romain Chebret, Cisse (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/086,138

(22) PCT Filed: Nov. 28, 2006

(86) PCT No.: PCT/SE2006/001341

§ 371 (c)(1),
(2), (4) Date: Jun. 6, 2008

(87) PCT Pub. No.: WO2007/067122

PCT Pub. Date: Jun. 14, 2007

(65) Prior Publication Data

US 2009/0309337 A1    Dec. 17, 2009

(30) Foreign Application Priority Data

Dec. 8, 2005 (GB) ................................ 0525059.2

(51) Int. Cl.
*B60R 21/203* (2006.01)
*B60R 21/217* (2006.01)
(52) U.S. Cl. ..................................... 280/728.2; 280/731
(58) Field of Classification Search .............. 280/728.2, 280/731
See application file for complete search history.

(56) References Cited

U.S. PATENT DOCUMENTS 5,380,037 A * 1/1995 Worrell et al. ........... 280/728.2
5,470,100 A * 11/1995 Gordon .................... 280/728.2
5,899,487 A   5/1999 Fischer et al.
6,237,944 B1   5/2001 Worrell et al.

(Continued)

FOREIGN PATENT DOCUMENTS

EP    1167132 A2    1/2002

(Continued)

*Primary Examiner*—Paul N Dickson
*Assistant Examiner*—Laura Freedman
(74) *Attorney, Agent, or Firm*—Harness, Dickey & Pierce, P.L.C.

(57) ABSTRACT

A mounting arrangement for mounting an air-bag module to a hub of a steering wheel. The hub being provided with apertures and cutaway sections and a spring. The spring is moveable from a release position in which parts of the spring do not extend across the apertures or the cutaway sections to a locking position in which parts of the spring extend across the apertures and the cutaway sections. The spring is initially deformed and is held in the release position against blocking elements. The air-bag module is provided with hooks which are positioned on the air-bag module to correspond to the positions of the apertures and the cutaway sections on the hub. The air-bag module is provided with an actuation member which, when the hooks are inserted into the apertures, engages part of the spring to urge the spring out of engagement with the blocking elements. When the spring is moved out of engagement with the blocking elements the spring moves from the release position to the locking position and parts of the spring extend into recesses in the hooks to lock the hooks in position relative to the hub.

11 Claims, 14 Drawing Sheets

U.S. PATENT DOCUMENTS

Figure 1:
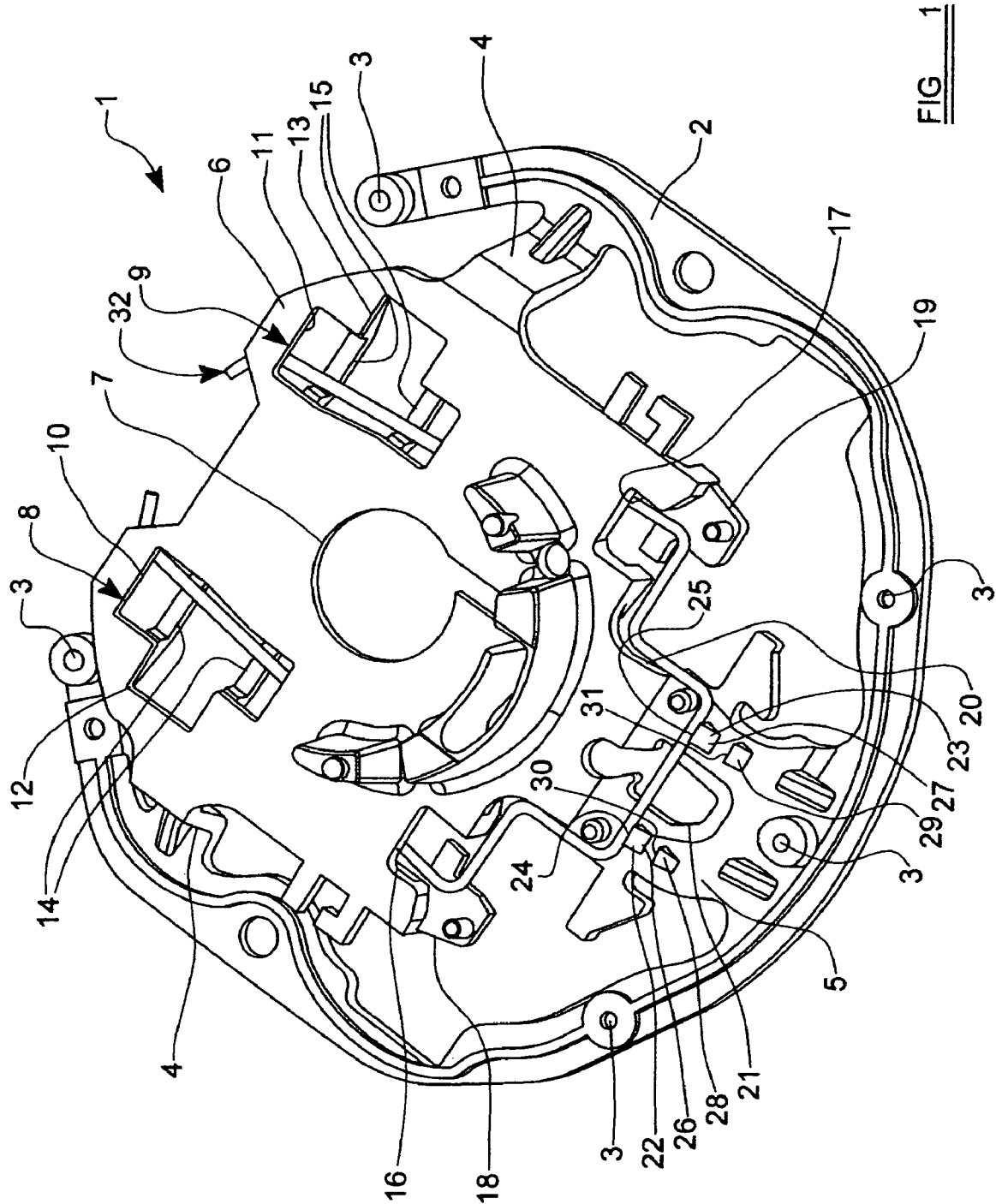

| | | |
|---|---|---|
| 6,307,454 B1 | 10/2001 | Quentric et al. |
| 6,554,312 B2 | 4/2003 | Sakane et al. |
| 7,185,915 B2 | 3/2007 | Fujita et al. |
| 7,533,897 B1 * | 5/2009 | Xu et al. .................. 280/728.2 |
| 7,556,282 B2 * | 7/2009 | Vigeant et al. ............ 280/728.2 |
| 7,566,071 B2 * | 7/2009 | Tsujimoto et al. ........... 280/731 |
| 2001/0054810 A1 | 12/2001 | Sakane et al. |
| 2003/0173759 A1 * | 9/2003 | Grenier ................... 280/728.2 |
| 2004/0169358 A1 | 9/2004 | Fujita et al. |

FOREIGN PATENT DOCUMENTS

| | | |
|---|---|---|
| EP | 1179457 A1 | 2/2002 |
| FR | 2790044 A1 | 8/2000 |
| GB | 2385834 A | 9/2003 |

\* cited by examiner

MOUNTING ARRANGEMENT FOR MOUNTING AN AIR-BAG MODULE

CROSS-REFERENCE TO RELATED APPLICATIONS

This application is a 371 U.S. National Stage of International Application No. PCT/SE2006/001341, filed Nov. 28, 2006 and published in English as WO 2007/067122 A1 on Jun. 14, 2007. This application claims priority to United Kingdom Patent Application No. GB0525059.2, filed Dec. 8, 2005, which application is herein expressly incorporated by reference.

DESCRIPTION OF INVENTION

THE PRESENT INVENTION relates to a mounting arrangement, and more particularly relates to a mounting arrangement for mounting an air-bag module to a steering wheel.

A mounting arrangement has been proposed previously in UK Patent Application No. GB-A-2385834 to allow an air-bag module to be mounted on a steering wheel. This prior proposed mounting arrangement has a mounting plate formed as part of the steering wheel structure, the plate being provided with a plurality of apertures to receive feet formed on the base of an air-bag module. A spring is moveably mounted to the mounting plate so that a part of the spring extends across each of the apertures.

The air-bag module of this prior proposed arrangement may be mounted to the mounting plate by pushing the feet of the air-bag module through the apertures formed through the plate, with the feet deforming the spring as they are pushed through the apertures. When the feet of the air-bag module have been pushed sufficiently far through the apertures, parts of the spring move into recesses in the feet to retain the feet, and hence the air-bag module, in position on the mounting plate. The spring thus provides a snap-action fastening for mounting the feet of the air-bag module to the mounting plate, hence the arrangement provides a convenient connection which can be made up, for example, on an assembly line.

Although the prior-proposed mounting arrangement discussed above provides a quick and secure configuration for mounting an air-bag module to a steering wheel, it has been noted that a substantial force is required by an assembly worker to push the air-bag module against the mounting plate to enable snap-action fastening to occur. A worker working on an assembly line is likely to have to mount many air-bag modules to steering wheels everyday, and thus there is a chance that the worker may suffer some discomfort or even injury as a result of having to exert the substantial force repetitively.

The present invention seeks to provide an improved mounting arrangement.

According to the present invention, there is provided a mounting arrangement for mounting an air-bag module to a steering wheel, the mounting arrangement comprising a first mounting device and a second mounting device, one of the said mounting devices being attached to the air-bag module and the other said mounting device being attached to part of the steering wheel, the first mounting device incorporating at least one retaining member and an actuation member, the second mounting device incorporating a body portion which is provided with at least one aperture, at least one blocking element and a spring, the spring being moveably mounted to the body portion so as to be moveable between a release position, in which part of the spring does not extend across the at least one aperture, and a locking position, in which part of the spring extends across the at least one aperture, characterised by the spring being initially biased towards the locking position but held in the release position by engagement with the at least one blocking element, the actuation member being configured to urge at least part of the spring out of engagement with the at least one blocking element when part of at least one retaining member is inserted into a corresponding said at least one aperture to allow the spring to move from the release position to the locking position and thereby engage the at least one retaining member, locking the at least one retaining member in position relative to the body portion.

Preferably the first mounting device is attached to the said air-bag module and the second mounting device is attached to the said part of the steering wheel.

In one embodiment the said part of the steering wheel is a part of the steering wheel which does not rotate during steering of a vehicle in which the steering wheel is to be mounted, the said part of the steering wheel being configured to be mounted to a rotatable frame which incorporates a locking recess, the spring of the second mounting device being provided with a locking part which extends into the said recess when the said part of the steering wheel is attached to the frame to prevent rotation of the frame relative to the said part of the steering wheel, the spring being configured such that movement of the spring from its release position to its locking position causing said locking part to move out of said recess to permit subsequent rotation of the frame relative to the said part of the steering wheel.

Conveniently the said at least one retaining member is a hook-shaped member which defines a retaining recess to receive a part of the spring.

Advantageously the said retaining recess is dimensioned to receive a part of the spring when part of said at least one retaining member is inserted into one of the said at least one apertures, to allow the spring to move into the retaining recess to lock the said at least one retaining member in position relative to the body portion.

Preferably one end of the body portion is provided with two said apertures and the other end of the body portion is provided with two cutaway sections, the first mounting device incorporating a first pair of retaining members and a second pair of retaining member, the first pair of retaining members being positioned on the first mounting device such that when each of the first pair of retaining members is aligned with a respective one of the two said apertures, each of the second pair of retaining members is aligned with a respective one of the two said cutaway sections.

Conveniently the spring does not extend across each of the said apertures and the spring does not extend across each of the said cutaway sections when the spring is in the release position, the spring being moveable to the locking position in which a part of the spring extends across each of the said apertures and a part of the spring extends across each of the said cutaway sections.

Advantageously the spring moves to the locking position when at least part of one of the first pair of retaining members is inserted into a respective one of the said two apertures such that parts of the spring move to engage each of the retaining members, locking each of the retaining members in position relative to the body portion.

Preferably the at least one blocking element is a generally ramp-shaped element having a blocking face and an inclined section, the blocking face engaging the spring to hold the spring in the release position.

Conveniently the second mounting device further incorporates at least one generally ramp-shaped stop which has a stopping face which is configured to engage the spring to stop movement of the spring after the spring has moved from the release position to the locking position.

Advantageously the spring is moveable from the locking position to the release position when acted on by a removal tool to allow the air-bag module to be removed from the said part of the steering wheel.

Figure 2:
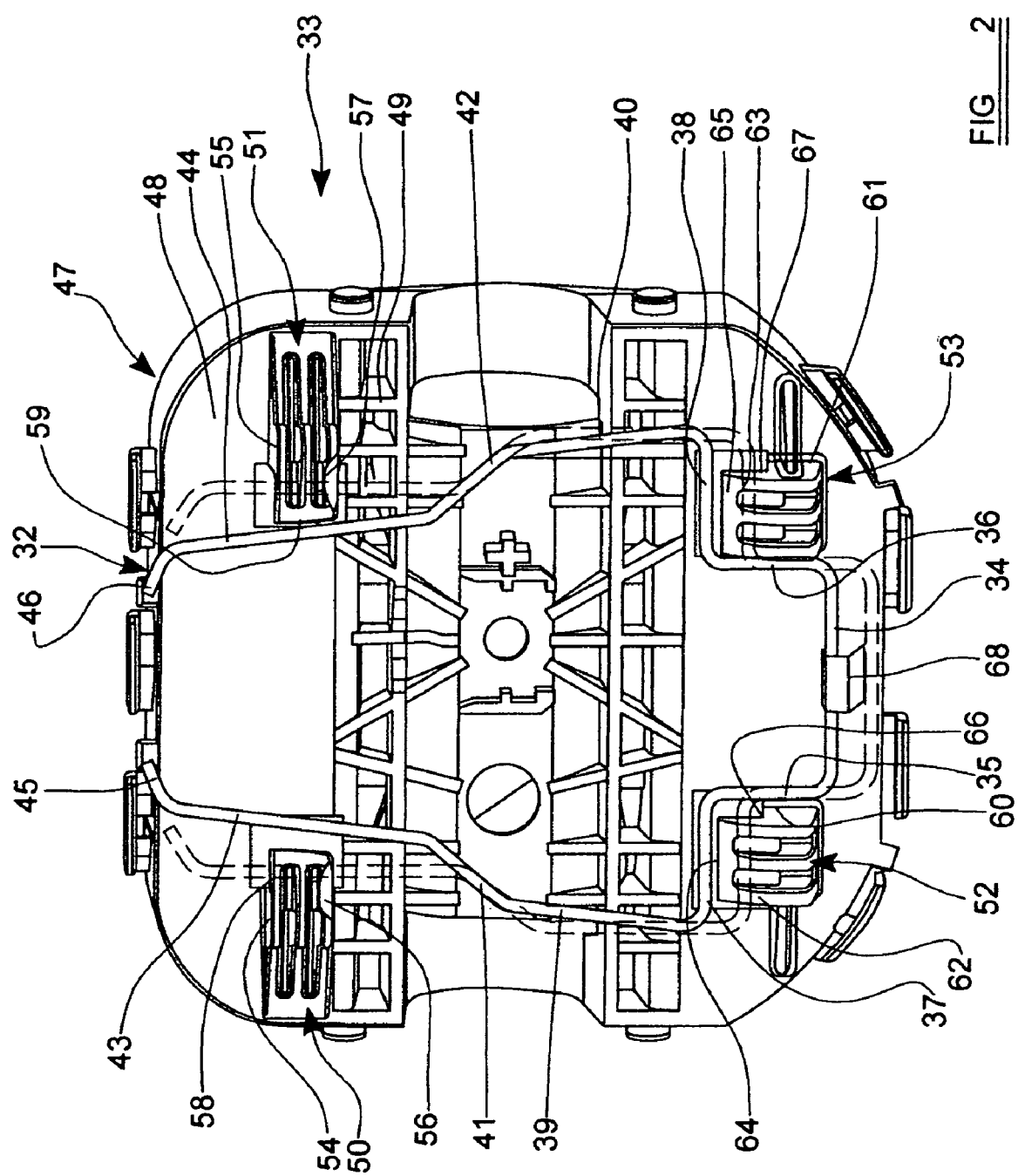
Figure 3:
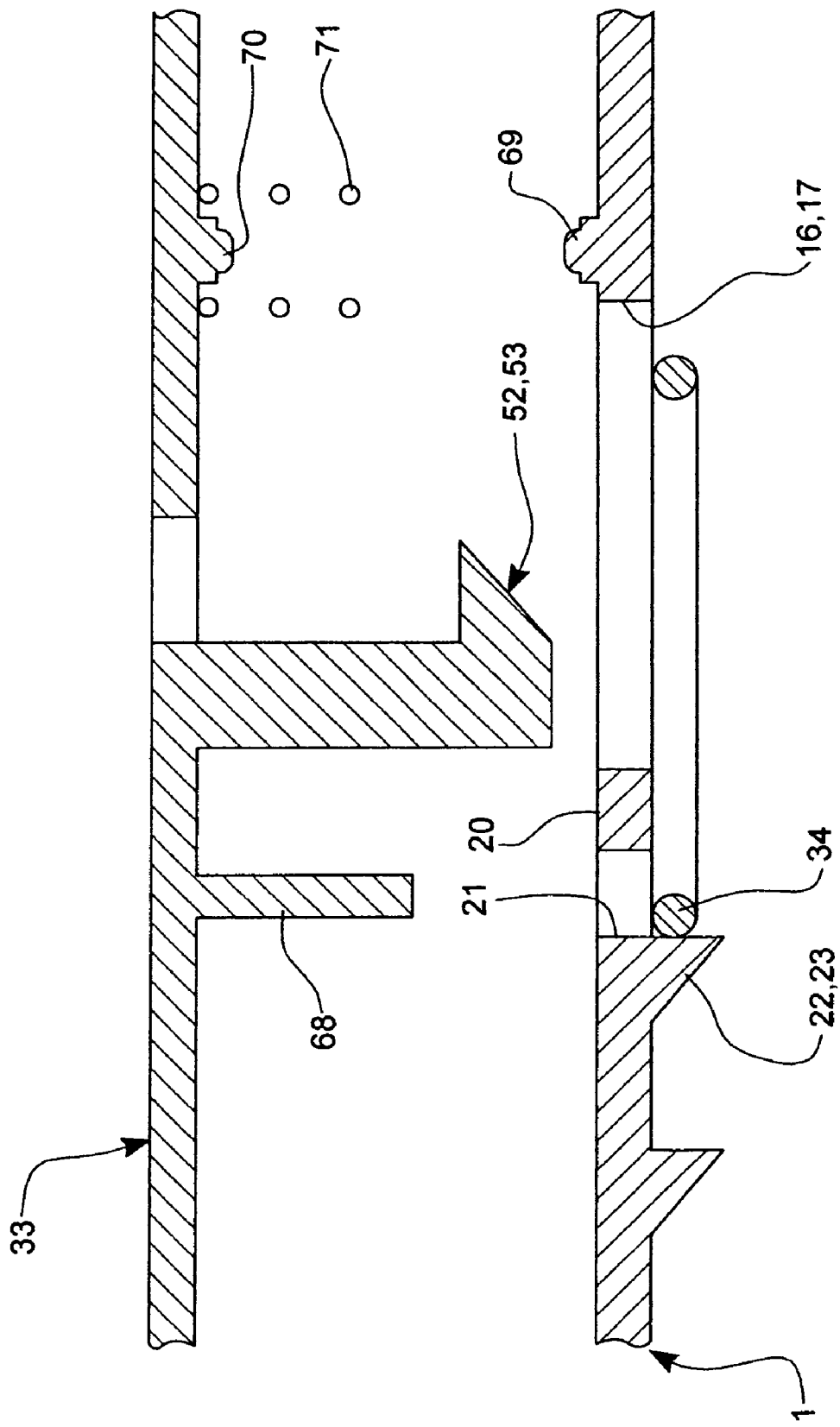
Figure 4:
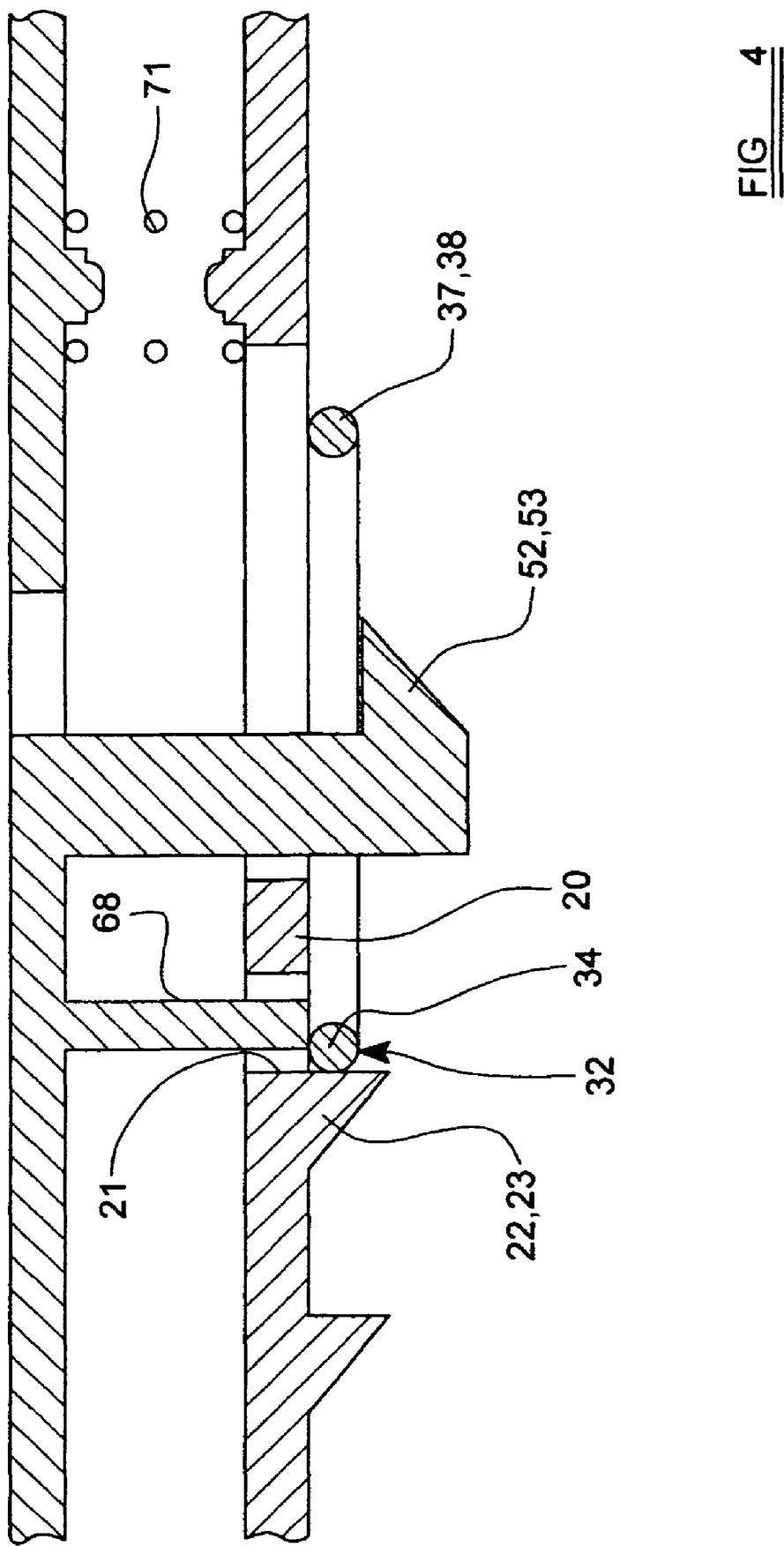
Figure 5:
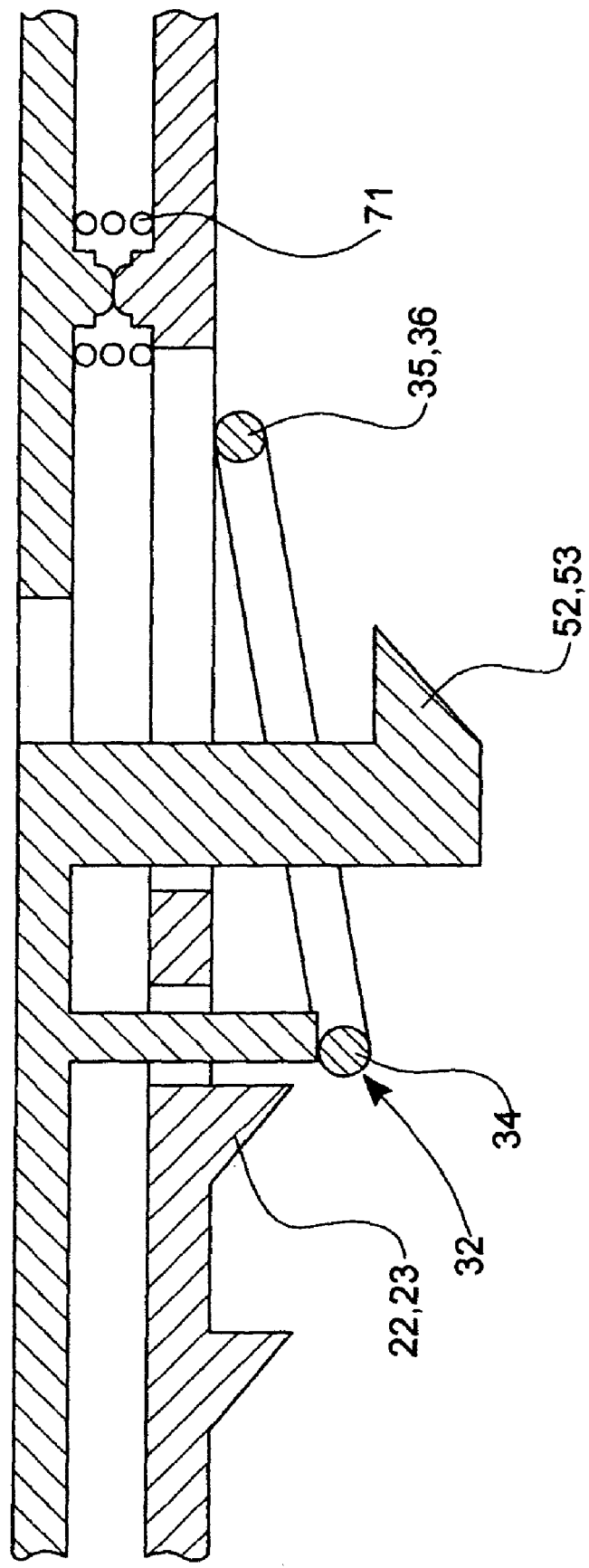
Figure 6:
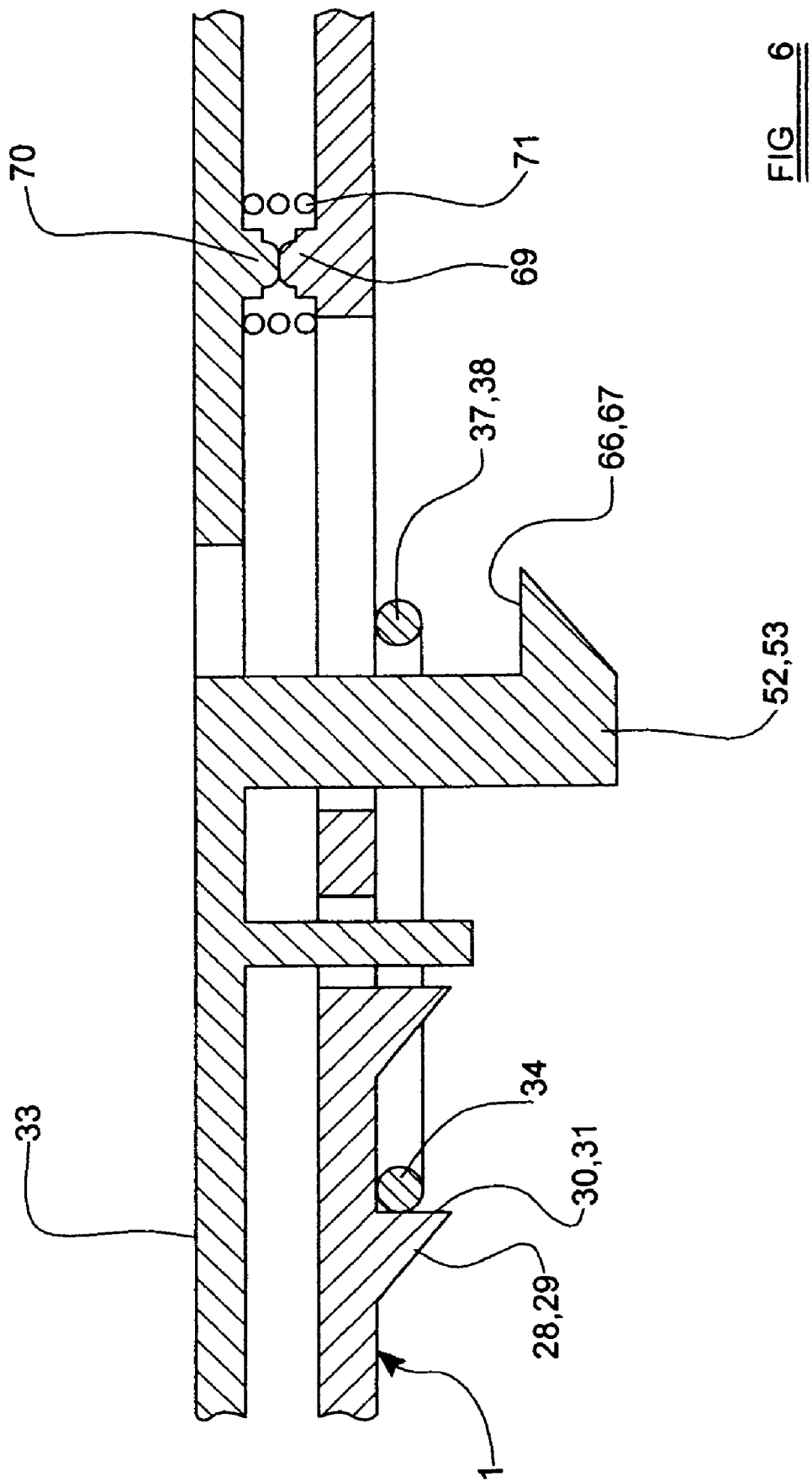
Figure 7:
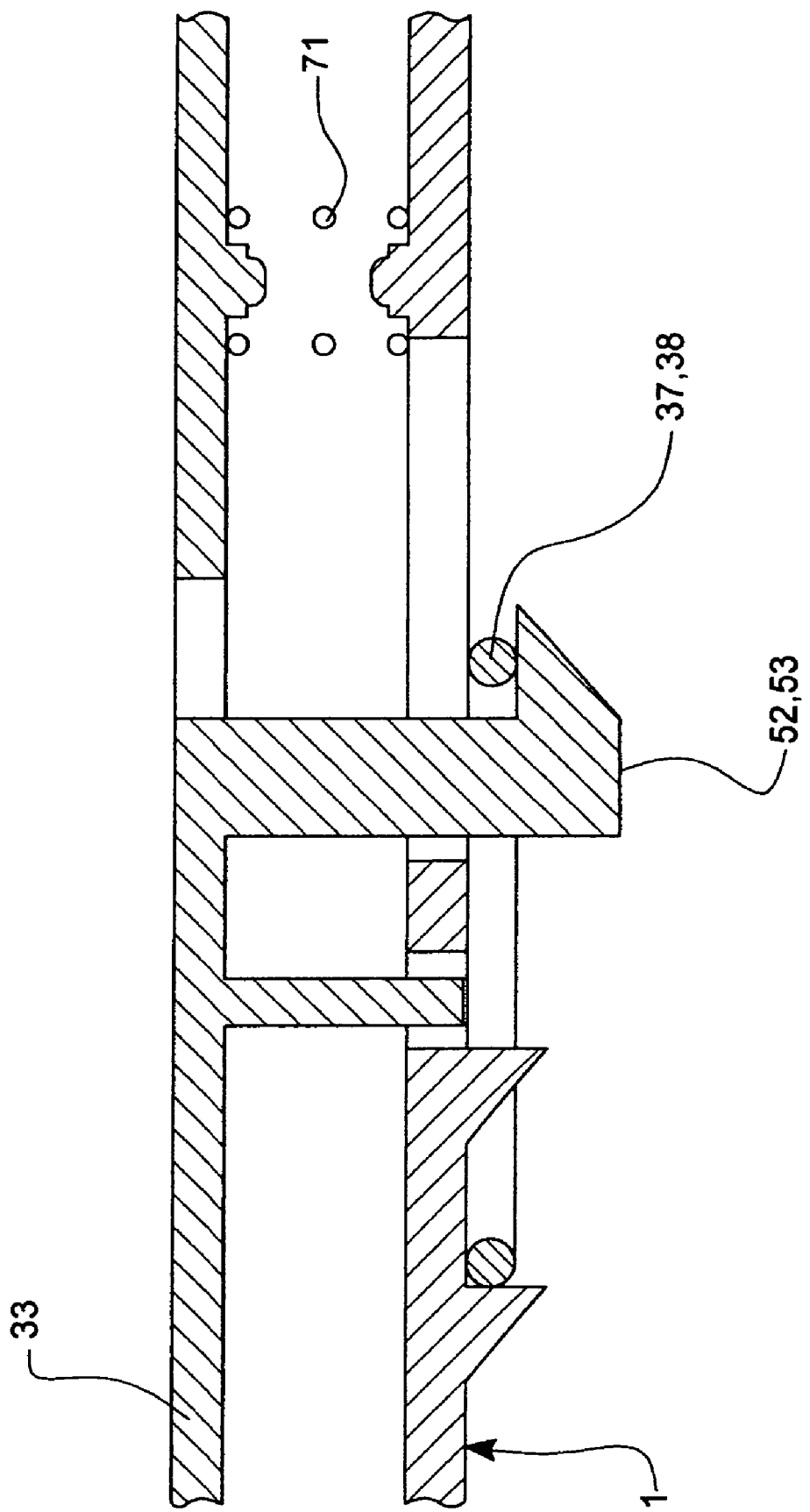
Figure 8:
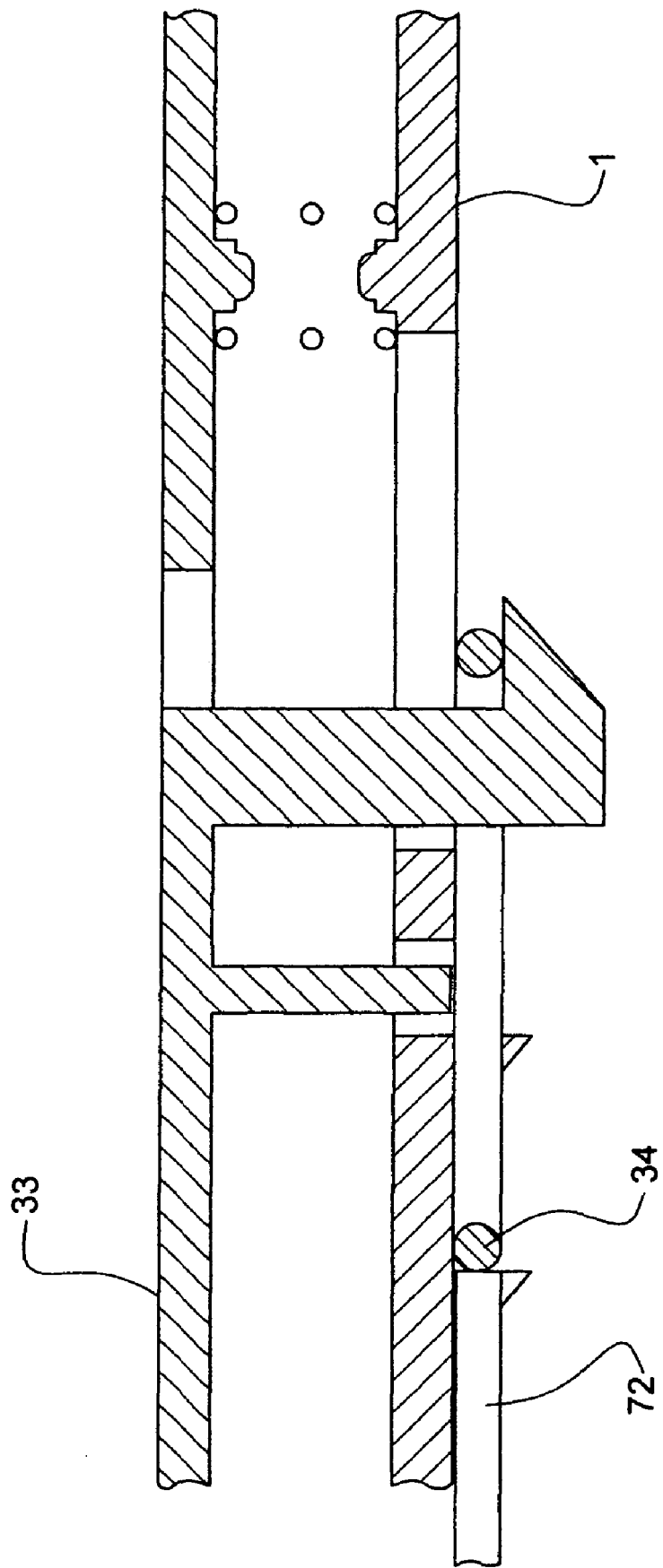
Figure 9:
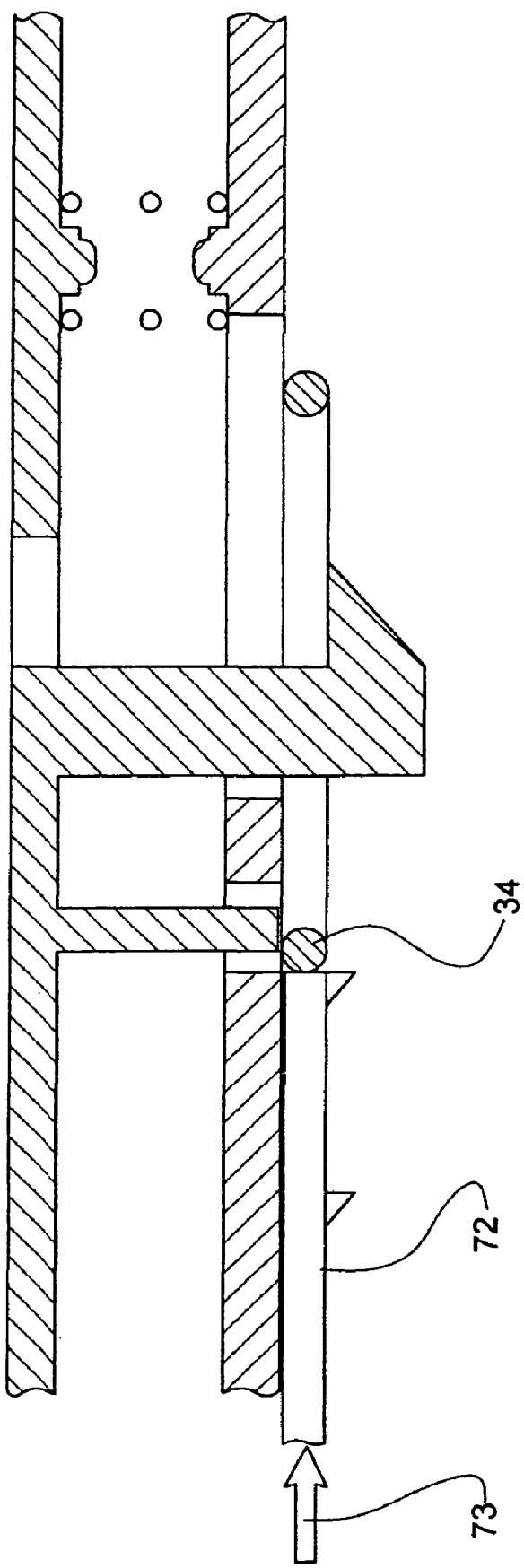
Figure 10:
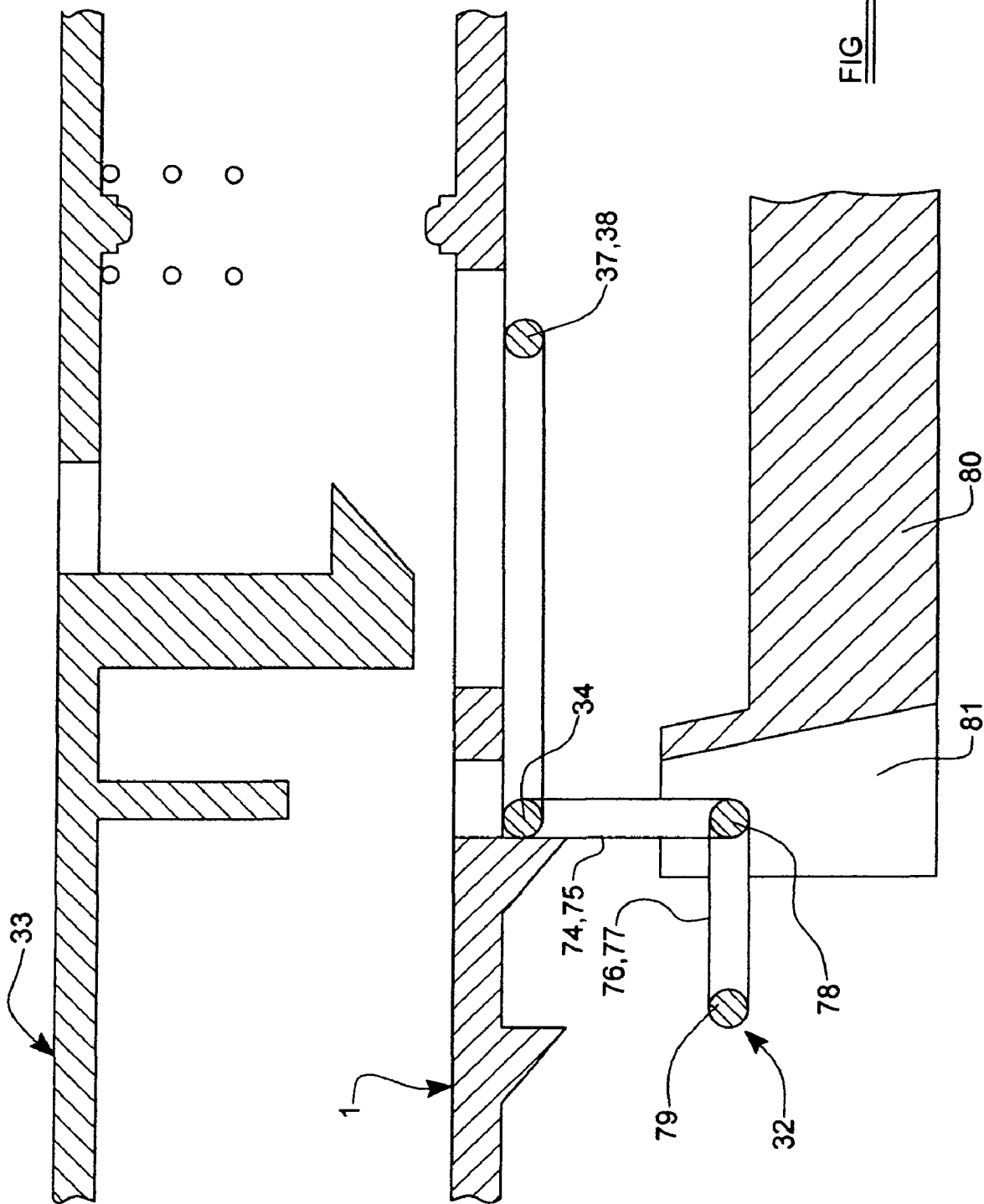
Figure 11:
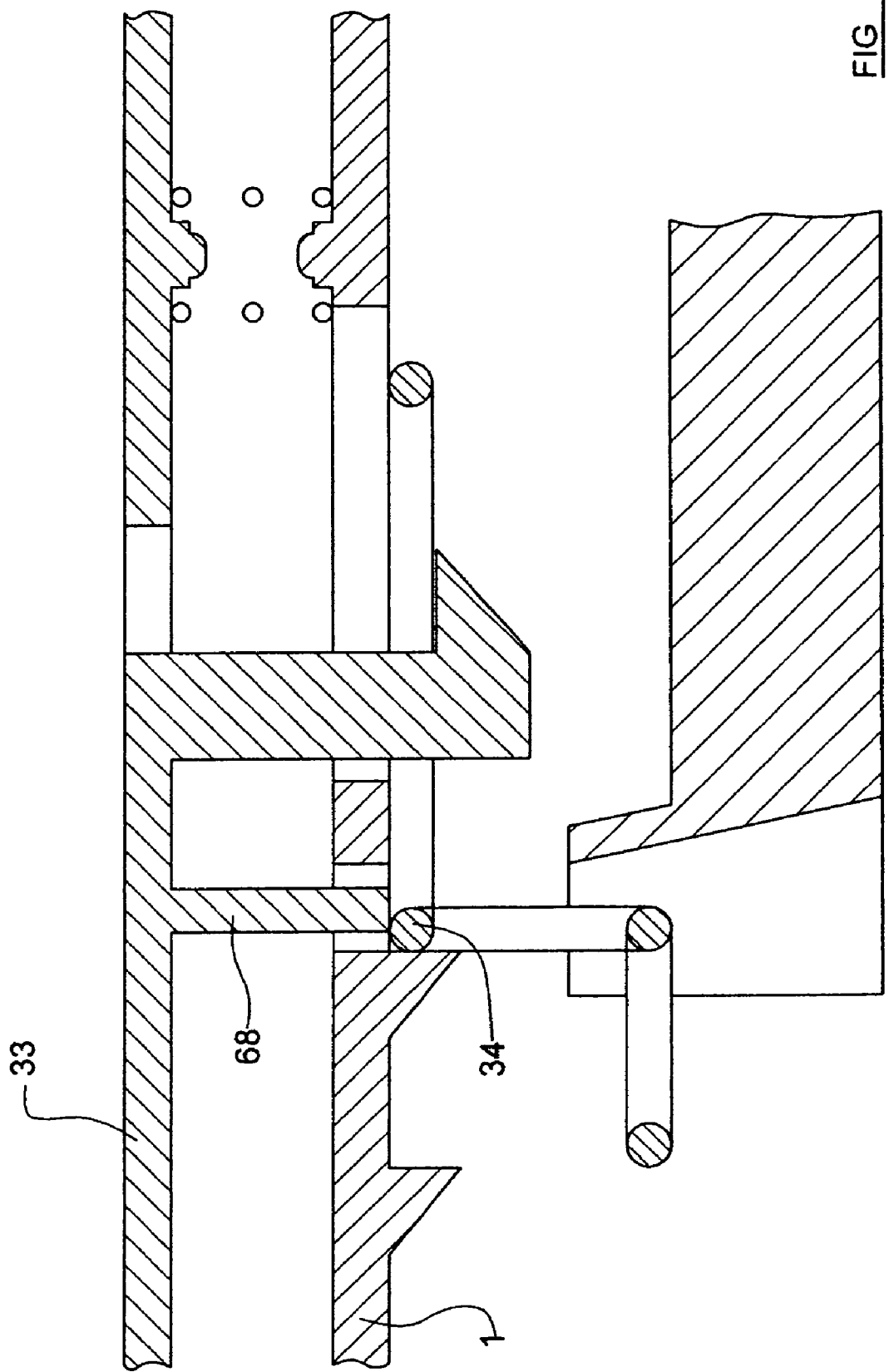
Figure 12:
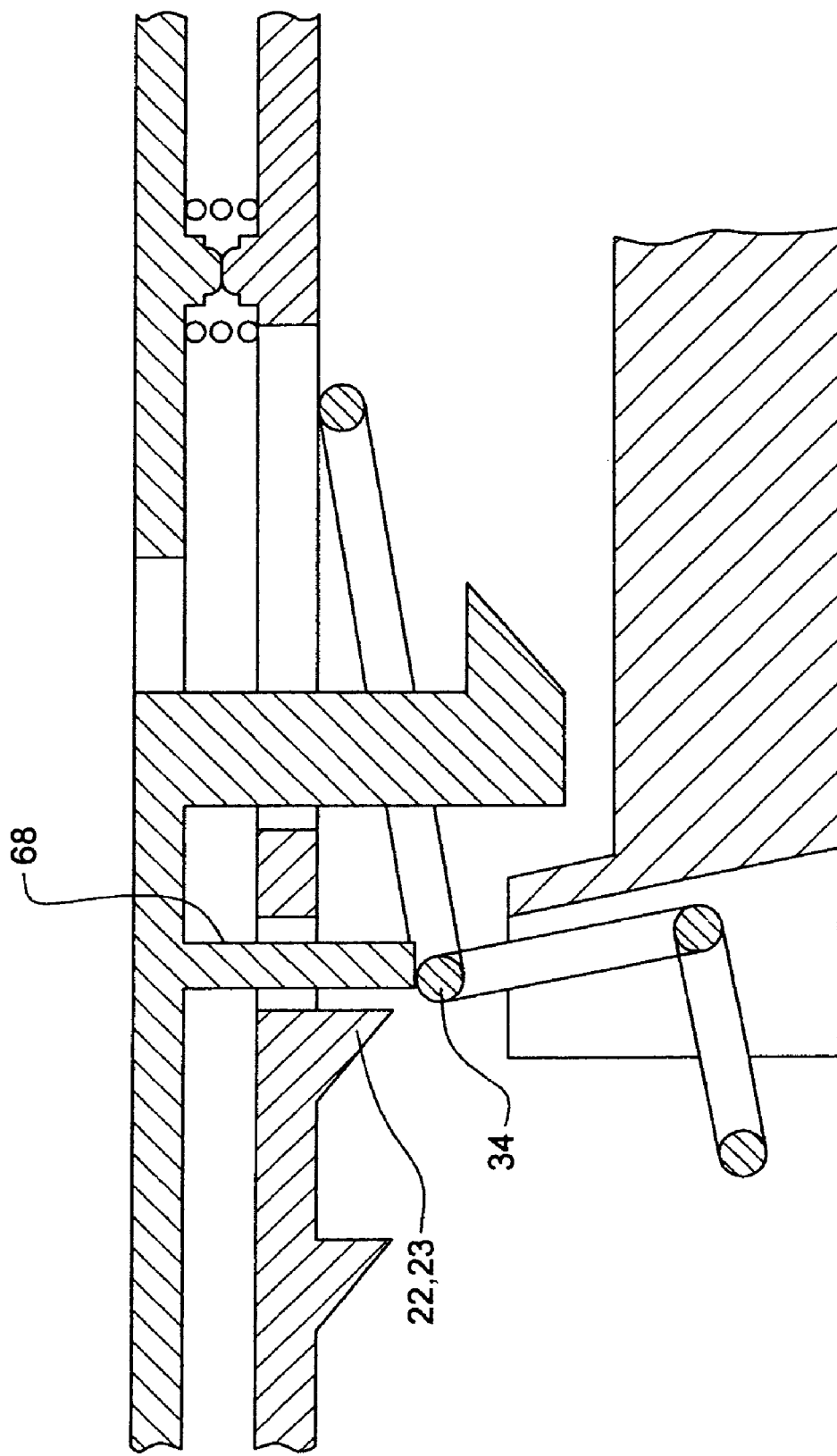
Figure 13:
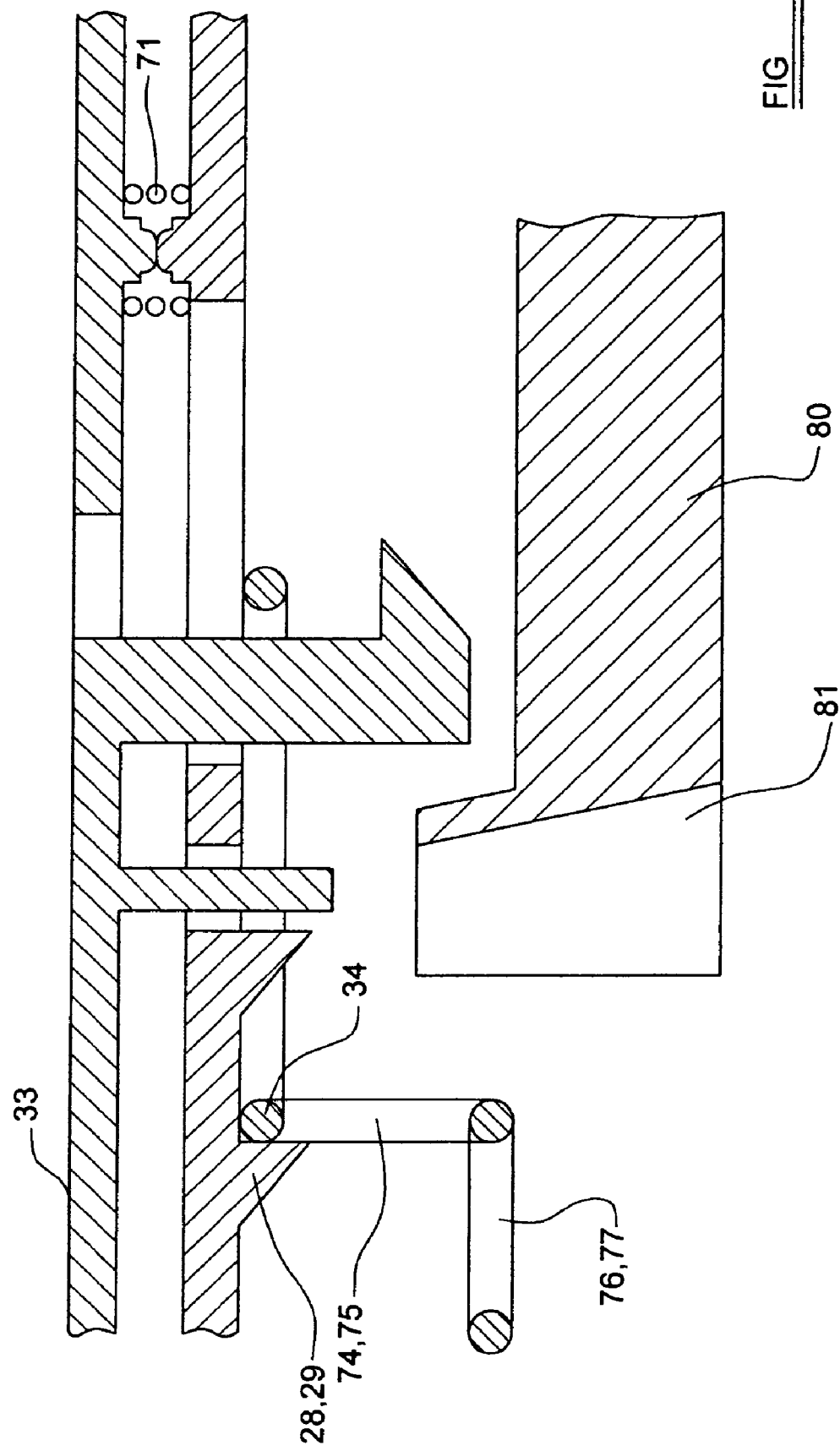
Figure 14:
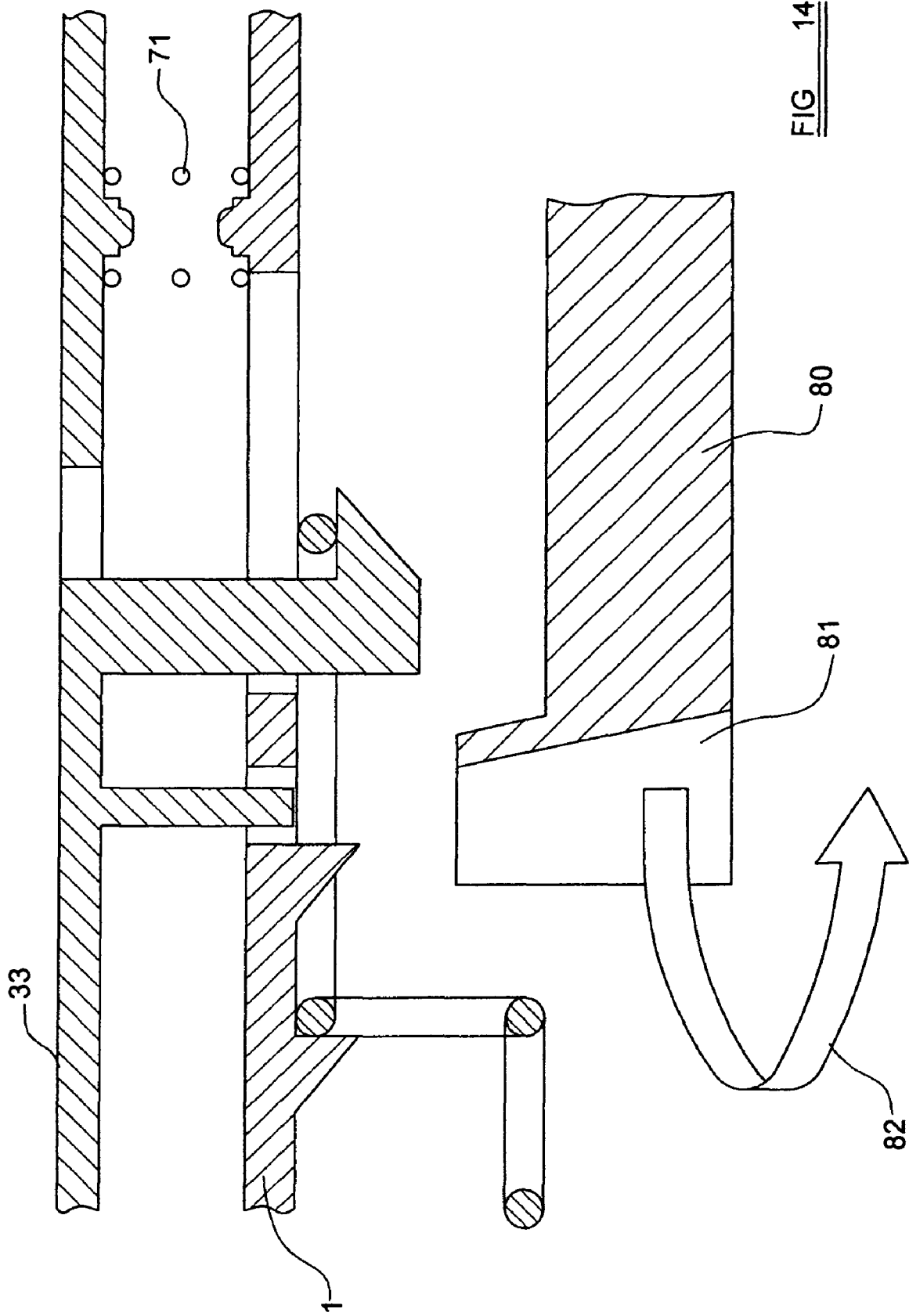

In order that the invention may be more readily understood, and so that further features thereof may be appreciated, embodiments of the invention will now be described, by way of example, with reference to the accompanying drawings in which:

FIG. 1 is a diagrammatic perspective view from below of part of a steering wheel which incorporates a first mounting device in accordance with a preferred embodiment of the invention, showing a spring in a release position, FIG. 2 is a diagrammatic perspective view from below of an air-bag module which incorporates a second mounting device in accordance with the preferred embodiment of the invention, the spring of the part of the steering wheel of FIG. 1 being shown for illustrative purposes relative to the air-bag module in the release position and in a locking position (in phantom), FIG. 3 is a diagrammatic sectional view through part of the air-bag module of FIG. 1 and part of the steering wheel of FIG. 2, FIG. 4 is a view corresponding to FIG. 3 with the air-bag module having been brought towards engagement with part of the steering wheel, during an initial stage of the mounting of the air-bag module to the steering wheel, FIG. 5 is a view corresponding to FIG. 3, at a later stage of the mounting of the air-bag module to the steering wheel, FIG. 6 is a view corresponding to FIG. 3 with the air-bag module having been mounted to the steering wheel, with the air-bag module being in a lower position so that a horn contact on the air-bag module is in contact with a horn contact on the steering wheel, FIG. 7 is a view corresponding generally to FIG. 3, but showing the spring in the locking position effective to retain the air-bag module against the steering wheel, in a final condition, FIG. 8 is a view corresponding to FIG. 7, showing a tool engaging part of the arrangement during an initial stage of subsequently releasing the mounting arrangement, FIG. 9 is a view corresponding to FIG. 8, during a later stage of the release of the mounting arrangement, FIG. 10 is a diagrammatic sectional view of a mounting arrangement in accordance with an alternative embodiment of the invention showing an air-bag module being offered up to a steering wheel, FIG. 11 is a view corresponding generally to FIG. 10, during an initial stage of the process mounting the air-bag module to the steering wheel showing the air-bag module being brought towards engagement with the steering wheel, FIG. 12 is a view corresponding generally to FIG. 10 showing the mounting arrangement during a later stage of the mounting process, FIG. 13 is a view corresponding to FIG. 10 of a still later stage of the mounting process, and FIG. 14 is a view corresponding to FIG. 10 of the mounting arrangement in a final condition.

Referring initially to FIG. 1, a part of a hub 1 of a steering wheel is illustrated from the rear. The hub 1 is provided with a first mounting device in accordance with a preferred embodiment of the invention. The hub 1 comprises a generally planar support ring 2 which is provided with a plurality of mounting apertures 3 at spaced apart positions around its periphery to allow the hub 1 to be mounted to a lower part of a steering wheel so that the steering wheel may be connected to the steering column of a motor vehicle.

Two upper support arms 4 and a lower support arm 5 are formed integrally with the support ring 2 and are inclined rearwardly from the support ring 2 towards the centre of the hub 1 where they are each integrally formed with a centrally located raised mounting plate 6. The mounting plate 6 is of generally rectangular shape and is dimensioned so as to fit concentrically within the centre of the support ring 2, but spaced rearwardly from the support ring 2 by the support arms 4,5. A circular aperture 7 is formed through a central region of the mounting plate 6 to receive a part of the steering column of a motor vehicle in which the steering wheel may be mounted.

Two generally T-shaped apertures 8,9 are formed through the upper part of the mounting plate 6, each aperture being located on a respective side of the mounting plate. The generally T-shaped apertures 8,9 are identical to one another and each have a relatively long rectangular section 10,11 with a relatively short rectangular section 12,13 extending from one side. A pair of support beams 14,15 are formed integrally with the mounting plate 6 to hang beneath the mounting plate 6 and extend across a corresponding one of the relatively long sections 10,11 of the T-shaped apertures 8,9. The purpose of the support beams 14,15 will become clear from the description below.

The lower edge of the mounting plate 6 is provided with a respective cutaway section 16,17 on each side of the lower edge. Two support platforms 18,19 are formed integrally with each side of the mounting plate 6 so as to define planar surfaces which are positioned below the level of the mounting plate 6, adjacent each of the cutaway sections 16,17. The purpose of the support platforms 18,19 will also become clear from the description below.

The mounting plate 6 has a generally planar strip 20 which protrudes outwardly from its central region, between the cutaway sections 16,17, and is formed integrally with the lower support arm 5. A release aperture 21 extends partway along the length of the strip 20 and partway down the lower support arm 5.

Two generally ramp-shaped blocking elements 22,23 are formed integrally with the strip 20, so as to protrude rearwardly from the upper surface of the strip 20 with one of the blocking elements 22,23 being positioned on each side of the lower aperture 21. The generally ramp-shaped blocking elements 22,23 are each configured to present a respective blocking face 24,25 which is orientated so as to be substantially perpendicular to the plane of the mounting plate 6 and to face towards the central region of the mounting plate 6. The ramp-shaped blocking elements 22,23 are also each configured to provide a respective inclined surface 26,27 which extends from the upper edge of each blocking face 24,25 to the surface of the strip 20.

Two generally ramp-shaped stops 28,29 are formed integrally with the strip 20, so as to protrude rearwardly from the upper surface of the strip 20 with one stop 28,29 being positioned on each side of the lower aperture 21. The stops 28,29 are substantially identical in form to the ramp-shaped blocking elements 22,23 and each of the stops 28,29 is positioned directly behind one of the ramp-shaped blocking elements 22,23. Each of the stops 28,29 is configured to present a respective stopping face 30,31.

The purpose of the lower aperture 21, the blocking elements 22,23 and the stops 28,29 will become clear from the description below.

The hub 1 is provided with a spring 32 which is dimensioned to sit in front of and generally adjacent the mounting plate 6. The spring 32 is supported by the support beams 14,15, the support platforms 18,19 and the upper surface of the strip 20. The shape of the spring 32 can be seen more clearly in FIG. 2 where the spring 32 is shown for illustrative purposes relative to an air-bag module 33. The spring 32 and the air-bag module 33 will be described in detail below.

The spring 32 is generally U-shaped and has a central portion 34 and two arm portions which extend substantially perpendicularly from the central portion 34. The spring 32 is of a resilient material, and it is to be appreciated that the spring 32 can adopt either a substantially undeformed locking position as seen in phantom in FIG. 2, or a deformed release position as seen in solid line in FIG. 1 and FIG. 2 in which the spring 32 is placed under strain.

Each end of the central portion 34 is formed integrally with a respective first spacer section 35,36. The first spacer sections 35,36 are each angled perpendicularly to the central portion 34 and are substantially parallel to one another but spaced apart from one another by the central portion 34. First engagement sections 37,38 are formed integrally with the upper ends of the respective first spacer sections 35,36, so as to extend perpendicularly outwardly from the first spacer sections 35,36, parallel to the central portion 34 and in the same plane as the central portion 34.

Second spacer sections 39,40 are formed integrally with the ends of each of the engagement sections 37,38 so as to extend upwardly from the first engagement sections 37,38, to be parallel and in the same plane as the first spacer sections 35,36 when the spring 32 adopts its undeformed state. The upper ends of each of the second spacer sections 39,40 are formed integrally with a respective inwardly angled section 41,42 which each lie at approximately 45° to the longitudinal axis of the second spacer sections 39,40.

The upper ends of the inwardly angled sections 41,42 are formed integrally with respective second engagement sections 43,44 which extend upwardly from the angled sections 41,42 so as to be substantially parallel to the spacer sections 39,40 and 35,36 and in the same plane. The upper ends of the second engagement sections 43,44 are formed integrally with inwardly directed terminating ends 45,46 which define the upper ends of the generally U-shaped spring 32.

It is to be understood that the spacer sections 35,36,37,38, the engagement sections 37,38,43,44, the angled sections 41,42 and the terminating ends 45,46 define the arm portions which extend substantially perpendicularly from the central portion 34 of the spring 32.

When the spring 32 is in the release position, illustrated in solid line in FIG. 2, the spring 32 is in a deformed condition and is held in a deformed condition by the blocking elements 22,23 which contact the central portion 34 of the spring 32, as shown most clearly in FIG. 1. When the spring 32 is being held in the release position by the blocking elements 22,23 the inwardly angled sections 41,42 of the spring 32 are each pushed against a respective blocking peg (not visible in FIG. 1) which is positioned generally mid-way between a respective T-shaped aperture 8,9 and a respective cut-away section 16, 17 so as to protrude upwardly from the mounting plate 6 on the same side of the mounting plate 6 as the support beams 14,15. When the spring 32 is held in the release position by the blocking elements 22,23 and the inclined sections 39,40 are being pushed against the blocking pegs the spring 32 is deformed about the points where the first engagement sections 37,38 join the second spacer sections 39,40. This deformation of the spring 32 results in the second engagement sections 43,44 being angled towards one another, as illustrated in solid line in FIG. 2.

When the spring 32 is held in the release position the blocking elements 22,23 and the blocking pegs act upon the spring 32 to retain the spring 32 in the deformed condition. The spring 32 is biased by its resilient deformation, towards the locking position and it is to be understood that if the central portion 34 is moved out of engagement with the blocking elements 22,23 the spring 32 will move from the release position to the locking position.

When the spring 32 is in the release position, the first engagement sections 37,38 do not extend across the cutaway section 16,17 and the second engagement sections 43,44 likewise do not extend across the T-shaped apertures 8,9.

The air-bag module 33, which is shown from the rear in FIG. 2, comprises a housing 47 to house an air-bag. The housing 47 of this preferred embodiment is of an injection moulded plastics material and defines a generally rectangular planar base 48. The corners of the planar base 48 are rounded and the housing 47 is dimensioned to fit concentrically within the support ring 2 of the hub 1, so that the sides of the module 33 engage the support arms 4,5 and the base 48 of the air-bag module 33 engages the mounting plate 6.

The housing 47 of the air-bag module 33 of this preferred embodiment incorporates a plurality of integrally moulded reinforcement struts 49 which extend across parts of the base 48 of the housing 47. However, in other embodiments of the invention these reinforcement struts 49 may be omitted if reinforcement of the housing 47 is not necessary.

The air-bag module 33 is provided with four retaining members in the form of two opposed hooks 50,51 and two parallel hooks 52,53. The hooks 50,51,53,54 are each formed integrally with the base plate 48 and protrude rearwardly from the plane defined by the base plate 48.

The two opposed hooks 50,51 are identical to one another and each have an upstanding member 54,55 which protrudes rearwardly from the base plate 48 of the air-bag module 33. The upper end of each of the upstanding members 54,55 is formed integrally with a generally perpendicularly extending hook member 58,59. The hook members 58,59 are tapered to a point which forms a respective front edge 56,57. The front edges 56,57 of the hook members 58,59 are not formed perpendicularly to the side walls of the hook members 58,59, but are at a slight angle to the perpendicular. The purpose of this slight angle will become clear from the description below.

A retaining recess 58a,59a is defined between the respective hook members 58,59, and the part of the base 48 in the region of the upstanding members 54,55. Each of the opposed hooks 52,53 is oriented such that the retaining recesses 58a, 59a oppose one another and are positioned on either side of the housing 47. It is to be understood that each of the retaining recesses 58a,59a is dimensioned to receive and retain a respective second engagement section 43,44 of the spring 32.

The two parallel hooks 52,53 are formed integrally with the base 48 and are each positioned on a respective side of the base 48 at the end of the base 48 which is remote from the two opposed hooks 52,53. The parallel hooks 52,53 are each defined by an upstanding member 60,61 which protrudes generally perpendicularly rearwardly from the base 48. The upper end of the upstanding members 60,61 are formed integrally with respective hook members 62,63 which extend perpendicularly outwardly from the upstanding members 58,59. The hook members 62,63 are of a similar configuration to the hook members 58,59 of the opposed hooks 52,53 but the hook members 62,63 of the parallel hooks 52,53 have a front edge 64,65 which is perpendicularly angled relative to the side of the upstanding members 60,61.

Further retaining recesses 66,67 are defined between the parallel hooks 52,53 and the part of the base 48 in the region of the upstanding members 60,61. The parallel hooks 52,53 are oriented such that the front edges 64,65 of the hook members 62,63 are parallel with one another, with each of the retaining recesses 66,67 facing in the same direction, and open towards a respective opposed hook 50,51. It is to be understood that the retaining recesses 66,67 of the two parallel hooks 52,53 are dimensioned to receive and retain a respective first engagement section 37,38 of the spring 32.

An actuation member 68 is formed integrally with a central region of the lower part of the base 48, as seen in FIG. 2. The actuation member is positioned midway between the parallel hooks 52,53 but spaced from the parallel hooks 52,53 and positioned close to the lower edge of the base 48. The actuation member 68 is of generally rectangular cross-section and protrudes perpendicularly rearwardly from the surface of the base 48 to a height which is slightly below the upper surface of the parallel hooks 52,53. The purpose of the actuation member 68 will become clear from the description below.

Referring now to FIG. 3, the first stage of the mounting of the air-bag module 33 to the hub involves the aligning of the opposed hooks 50,51 on the air-bag module 33 with the generally T-shaped apertures 8,9 on the hub 1. When the opposed hooks 50,51 are aligned with the T-shaped apertures 8,9 the parallel hooks 52,53 become positioned over the cutaway sections 16,17 on the hub 1, as seen in FIG. 3.

When the opposed hooks 50,51 are aligned with the T-shaped apertures 8,9 a horn contact 69 on the hub 1 is aligned with a horn contact 70 and coil spring 71 on the air-bag module 33. The horn contacts 70,71 provide electrical contacts which, when engaged with one another, allow an electrical current to flow around a horn circuit which sounds the horn in a motor vehicle in which the arrangement is mounted.

Once the hooks 50-53 are aligned with the T-shaped apertures 8,9 and the cutaway sections 16,17, the air-bag module 33 is moved further towards the hub 1 so that the ends of the opposed hooks become inserted into the corresponding T-shaped apertures 8,9. As the air-bag module 33 is moved towards the hub 1 the actuation member 68 becomes inserted into the lower aperture 21 in the strip 20 of the hub 1, as seen in FIG. 4. The coil spring 71 on the air-bag module 33 engages the hub 1 and the end of the actuation member 68 engages the central portion 34 of the spring 32. The air-bag module 33 is then pushed gently in the direction of the hub 1 so that the coil spring 71 becomes compressed and the actuation member 68 urges the central portion 34 of the spring 32 rearwardly, to a position where the central portion 34 is out of engagement with the blocking elements 22,23, as shown in FIG. 5.

Once the central portion 34 of the spring 32 is pushed out of engagement with the blocking members 22,23 by the actuation member 68, the spring 32, which was initially held in the deformed condition against the blocking members 22,23, becomes free to move to the undeformed condition. The inclined sections 41,42 of the spring 32 act upon the blocking pegs as the spring 32 returns to its undeformed condition, pushing the spring 32 downwardly. As the spring 32 is pushed downwardly the central portion 34 is guided along the inclined surfaces 26,27 of the blocking elements 22,23 towards the stops 28,29. Further movement of the central portion 34 is then restricted as the central portion 34 contacts the stops 28,29, as seen in FIG. 6.

As the central portion 34 moves away from the blocking elements 22,23 towards the stops 28,29 the spring 32 moves from the deformed release position to the substantially undeformed locking position. As the spring 32 moves to the locking position the first engagement sections 37,38 of the spring 32 move into the retaining recesses 66,67 defined by the parallel hooks 52,53, whilst the second engagement sections 43,44 move into the retaining recesses 58a,59a defined by the opposed hooks 50,51.

When the pressure on the air-bag module 33 is subsequently released the compressed coil spring 71 exerts a biasing force which pushes the air-bag module 33 away from the hub 1. As the air-bag module 33 is moved away from the hub 1 the hooks 50-53 are partially withdrawn from the apertures 8,9 and the cutaway sections 16,17. However, because the engagement sections 37,38,43,44 of the spring 32 are now positioned within the retaining recesses 58,59,64,65, the engagement sections 37,38,43,44 engage the hooks 50-53 and act as locking members which prevent the hooks 50-53 from being withdrawn further relative to the hub 1. The engagement sections 37,38,43,44 thus lock the hooks 50-53 in position relative to the hub 1, as seen in FIG. 7.

When the spring 32 is in the locking position, locking the hooks 50-53 relative to the hub 1, the arrangement is in a condition which, when the arrangement is installed in a vehicle, is a condition suitable for normal vehicle operation. However, it is to be understood that the mounting arrangement allows the air-bag module 33 to be pushed by a driver of the vehicle so that the coil spring 71 is compressed and the air-bag module 33 moves in a direction towards the hub 1. The air-bag module 33 can thus be moved by the driver so that the horn contacts 69,70 are brought into contact with one another to sound the vehicle's horn. When such pressure on the air-bag module 33 is released the coil spring 71 pushes the air-bag module 33 away from the hub 1, back to the condition for normal vehicle operation as seen in FIG. 7.

It is to be understood that during installation of the air-bag module 33 on the hub, the module 33 only needs to be pushed gently against the hub 1 for the actuation member 68 to move the central portion 34 of the spring 32, to actuate movement of the spring 32 to the locking position when the air-bag module 33 is mounted to the hub 1. This results in a worker assembling steering wheels only having to exert a gentle force on the air-bag module 33 to mount the air-bag module 33 to the hub 1. The gentle force exerted by the worker is unlikely to cause discomfort or injury to a worker who may be mounting air-bag modules onto hubs repetitively.

If the air-bag module 33 must be removed from the hub 1, for instance to replace the air-bag module 33 after it has been actuated, a removal tool 72 can be brought into engagement with the central portion 34 of the spring 32, as seen in FIG. 8. A force generally indicated by arrow 73 in a direction towards the centre of the hub 1 can then be exerted, via the tool on the central portion 34 of the spring 32, as seen in FIG. 9. The tool 72 can thus be used to deform the spring 32 and move it back to its release position. When the spring 32 is moved to the release position, the engagement sections 37,38,43,44 move out from the recesses 56,57,64,65 defined behind the hooks 50-53. The blocking elements 22,23 then block the central portion 34 to prevent the spring 32 from returning to the locking position. The hooks 50-53 are thus no longer locked relative to the hub 1 and the air-bag module 33 may be removed from the hub 1. It is to be appreciated that the spring 32 is then retained in the release position, ready for the air-bag module 33, or a replacement air-bag module 33, to be remounted to the hub 1 as described above.

Referring now to FIG. 10, a mounting arrangement in accordance with an alternative embodiment of the invention has many parts which are identical to the parts of the preferred embodiment of the invention described above. Indeed, this alternative embodiment has a hub 1 and an air-bag module 33 which are each identical to the hub 1 and the air-bag module 33 of the preferred embodiment described above. The spring 32 of this alternative embodiment is primarily the same as the spring of the above described embodiment, but the spring 32 of this alternative embodiment further incorporates two first locking portions 74,75 and two second locking portions 76,77.

One of the two first locking portions 74,75 extends perpendicularly rearwardly from each end of the central portion 34 of the spring 32. The ends of each of the first locking portions 74,75 are connected together by a locking bar 78. The locking bar 78 is orientated so as to be parallel with the central portion 34 of the spring 32 and positioned so as to be directly below the central portion 34. Each of the second locking portions 76,77 extends from a respective end of the locking bar 78 in a direction which is perpendicular to the first locking portions 74,75 and parallel to the plane defined by the spacer sections and engagement sections 33-42 of the spring 32. The ends of the second locking portions 76,77 are joined by a lower central portion 79. The purpose of the locking portions 74-77 will become clear from the description below.

The mounting arrangement of this alternative embodiment is designed for mounting an air-bag module to the hub of a steering wheel of the type having a fixed hub which does not rotate as the rim of the wheel is turned.

The hub 1 is mounted to a steering wheel frame 80 in such a way that the hub 1 remains stationary whilst the frame 80 of the steering wheel is rotated as the steering wheel is turned. A section of the side of the frame 80 is indented at a point around its periphery to form a notch 81. The notch 81 is dimensioned so as to be able to receive the locking bar 78 of the spring 32.

During assembly of a steering wheel having a mounting arrangement of this alternative embodiment, the frame 80 is rotated so that the notch 81 is in a position to receive the locking bar 78 on the spring 32. The hub 1 is then attached to the frame 80. The locking bar 78 is positioned within the notch 81 to prevent the frame 80 from rotating relative to the hub 1 during subsequent assembly. The frame 80 and hub 1 are then mounted to the steering column of a motor vehicle, with the frame 80 and hub 1 remaining non-rotatable with respect to one another by virtue of the engagement of the locking bar 78 within the notch 81.

Once the frame 80 and hub 1 are mounted in the vehicle, the air-bag module 33 is mounted to the hub 1 generally as described above. However, in this alternative embodiment, when the actuation member 68 contacts the central portion 34 of the spring 32, as seen in FIG. 11, the actuation member 68 moves the central portion 34 and the locking sections 74-77 and the locking bar 78 rearwardly, as seen in FIG. 12. When the central portion 34 is moved out of engagement with the blocking elements 22,23 the spring 32 moves to the locking position as discussed above. As the spring 32 is moved to the locking position the locking portion 74-77 and the locking bar 78 are moved out from the notch 81 in the frame 80, as seen in FIG. 13.

When the pressure on the air-bag module 33 is subsequently removed the air-bag module 33 moves, under bias from the coil spring 71, away from the hub 1, as seen in FIG. 14. The air-bag module 33 is then locked in position relative to the hub 1 and because the locking bar 78 and locking portions 74-77 of the spring 32 are no longer within the notch 81 in the frame 80, the frame 80 becomes free to rotate relative to the hub 1 and air-bag module 33 in the direction generally indicated by arrow 82.

It is to be appreciated that the mounting arrangement of this alternative embodiment allows an air-bag module to be correctly orientated and then fixed to a non-rotatable part of a steering wheel, whilst still only requiring a gentle force to be exerted.

The mounting arrangement of this alternative embodiment is configured to allow the air-bag module 33 to be removed from the hub 1 using the removal tool 72 as described above.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A mounting arrangement for mounting an air-bag module to a steering wheel, the mounting arrangement comprising:
a first mounting device and a second mounting device, one of the mounting devices attached to the air-bag module and the other of the mounting devices being attached to the steering wheel, the first mounting device including at least one retaining member and an actuation member, the second mounting device incorporating a body portion which is provided with at least one aperture, at least one blocking element and a spring, the spring being moveably mounted to the body portion so as to be moveable between a release position, in which part of the spring does not extend across the at least one aperture, and a locking position, in which part of the spring extends across the at least one aperture, the spring being initially biased towards the locking position but held in the release position by engagement with the at least one blocking element, the actuation member being configured to urge at least part of the spring out of engagement with the at least one blocking element when a portion of at least one retaining member is inserted into a corresponding aperture to allow the spring to move from the release position to the locking position and thereby engage the at least one retaining member, locking the at least one retaining member in position relative to the body portion.

2. The mounting arrangement according to claim 1, wherein the first mounting device is attached to the air-bag module and the second mounting device is attached to the steering wheel.

3. The mounting arrangement according to claim 2, wherein the second mounting device is attached to a part of the steering wheel which does not rotate during steering of a vehicle in which the steering wheel is to be mounted, the part of the steering wheel being configured to be mounted to a rotatable frame which incorporates a locking recess, the spring of the second mounting device being provided with a locking part which extends into the recess when the part of the steering wheel is attached to the frame to prevent rotation of the frame relative to the part of the steering wheel, the spring being configured such that movement of the spring from its release position to its locking position causes the locking part to move out of the recess to permit subsequent rotation of the frame relative to the part of the steering wheel.

4. The mounting arrangement according to claim 1, wherein the at least one retaining member is a hook-shaped member which defines a retaining recess to receive a part of the spring.

5. The mounting arrangement according to claim 4, wherein the retaining recess is dimensioned to receive part of the spring when a portion of the at least one retaining member is inserted into one of the at least one apertures, to allow the spring to move into the retaining recess to lock the at least one retaining member in position relative to the body portion.

6. The mounting arrangement according to claim 1, wherein one end of the body portion is provided with two apertures and the other end of the body portion is provided with two cutaway sections, the first mounting device incorporating a first pair of retaining members and a second pair of retaining members, the first pair of retaining members being positioned on the first mounting device such that when each of the first pair of retaining members is aligned with a respective one of the two apertures, each of the second pair of retaining members is aligned with a respective one of the two cutaway sections.

7. The mounting arrangement according to claim 6, wherein the spring does not extend across each of the apertures and the spring does not extend across each of the cutaway sections when the spring is in the release position, the spring being moveable to the locking position in which a part of the spring extends across each of the apertures and a part of the spring extends across each of the cutaway sections.

8. The mounting arrangement according to claim 7, wherein the spring moves to the locking position when at least part of one of the first pair of retaining members is inserted into a respective one of the two apertures such that parts of the spring move to engage each of the retaining members, locking each of the retaining members in position relative to the body portion.

9. The mounting arrangement according to claim 1, wherein the at least one blocking element is a generally ramp-shaped element having a blocking face and an inclined section, the blocking face engaging the spring to hold the spring in the release position.

10. The mounting arrangement according to claim 1, wherein the second mounting device further includes at least one generally ramp-shaped stop which has a stopping face which is configured to engage the spring to stop movement of the spring after the spring has moved from the release position to the locking position.

11. The mounting arrangement according to claim 1, wherein the spring is moveable from the locking position to the release position when acted on by a removal tool to allow the air-bag module to be removed from the steering wheel.

* * * * *